US012304476B2

United States Patent
Kassar

(10) Patent No.: US 12,304,476 B2
(45) Date of Patent: May 20, 2025

(54) SYSTEMS AND METHODS FOR DEWEIGHTING VEERING MARGINS BASED ON CROSSING TIME

(71) Applicant: FORD GLOBAL TECHNOLOGIES, LLC, Dearborn, MI (US)

(72) Inventor: Alice Kassar, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 312 days.

(21) Appl. No.: 17/929,331

(22) Filed: Sep. 2, 2022

(65) Prior Publication Data
US 2024/0075923 A1   Mar. 7, 2024

(51) Int. Cl.
*B60W 30/095* (2012.01)
*B60W 60/00* (2020.01)

(52) U.S. Cl.
CPC .... *B60W 30/0956* (2013.01); *B60W 60/0027* (2020.02); *B60W 2520/10* (2013.01); *B60W 2554/4042* (2020.02); *B60W 2554/4044* (2020.02); *B60W 2554/801* (2020.02); *B60W 2754/20* (2020.02)

(58) Field of Classification Search
CPC ......... B60W 30/0956; B60W 60/0027; B60W 2554/4042; B60W 2554/4044; B60W 2554/801; B60W 2520/10
See application file for complete search history.

(56) References Cited

U.S. PATENT DOCUMENTS

| | | | |
|---|---|---|---|
| 10,535,269 B2* | 1/2020 | Um | B60W 30/09 |
| 11,079,764 B2* | 8/2021 | Nister | G05D 1/0221 |
| 11,465,619 B2* | 10/2022 | Silva | B60W 30/0956 |
| 11,520,343 B2* | 12/2022 | Varnhagen | G05D 1/0214 |
| 11,718,290 B2* | 8/2023 | Ollis | G08G 1/167 |
| | | | 701/26 |
| 11,897,461 B2* | 2/2024 | Hukkeri | B60W 40/04 |
| 2022/0219682 A1* | 7/2022 | Ollis | B60W 30/18109 |
| 2023/0415739 A1* | 12/2023 | Kassar | B60W 50/00 |

FOREIGN PATENT DOCUMENTS

WO   WO-2020092500 A1 *   5/2020   ......... B60W 30/025

* cited by examiner

*Primary Examiner* — Christian Chace
*Assistant Examiner* — Richard Edwin Geist
(74) *Attorney, Agent, or Firm* — Frank A. MacKenzie; Brooks Kushman P.C.

(57) ABSTRACT

This document discloses system, method, and computer program product embodiments for operating a vehicle. For example, the method includes: obtaining a vehicle trajectory for the vehicle and a possible object trajectory for a moving object; analyzing the vehicle trajectory and the possible object trajectory to identify a time interval in which a footprint of the vehicle overlaps laterally with a footprint of the object; generating a mover raw margin in the time interval by shifting the footprint of the vehicle laterally until contact is made with the footprint of the object; obtaining a crossing time associated with each point in the mover raw margin; and generating a mover strong boundary by laterally shifting point(s) of the mover raw margin in the direction towards the vehicle when the crossing time(s) associated with the point(s) is(are) equal to or less than a threshold time.

20 Claims, 17 Drawing Sheets

SYSTEMS AND METHODS FOR DEWEIGHTING VEERING MARGINS BASED ON CROSSING TIME

BACKGROUND

As an autonomous vehicle (AV) approaches a dynamic object (such as a mover), the AV uses a predicted trajectory of the dynamic object to modify its own trajectory, for example, veer around the dynamic object. However, current approaches do not account for the time at which the AV and mover will cross. Current approaches will handle a crossing prediction that starts in the short-term horizon with the same certainty as it handles a crossing prediction that starts in the long-term horizon. However, a mover prediction level of certainty drops as a function of lookahead time, i.e., a mover prediction state at a lookahead time of one second is more accurate than a mover prediction state at a lookahead time of eight seconds.

This document describes methods and systems that are directed to addressing the problems described above, and/or other issues.

SUMMARY

The present disclosure concerns implementing systems and methods for operating a vehicle, comprising: obtaining, by a computing device, a vehicle trajectory for the vehicle and a possible object trajectory for a moving object; analyzing, by the computing device, the vehicle trajectory and the possible object trajectory to identify a time interval in which a footprint of the vehicle overlaps laterally with a footprint of the object; generating, by the computing device, a mover raw margin in the time interval by shifting the footprint of the vehicle laterally until contact is made with the footprint of the object; obtaining, by the computing device, a crossing time associated with each point of a plurality of points in the mover raw margin; and generating, by the computing device, a mover strong boundary by laterally shifting the point of the mover raw margin in the direction towards the vehicle when the crossing time associated with the point is equal to or less than a threshold time.

The implementing systems can comprise: a processor; and a non-transitory computer-readable storage medium comprising programming instructions that are configured to cause the processor to implement a method for operating a vehicle. The above-described methods can also be implemented by a computer program product comprising memory and programming instructions that are configured to cause a processor to perform operations.

BRIEF DESCRIPTION OF THE DRAWINGS

The accompanying drawings are incorporated into this document and form a part of the specification.

FIG. 14-15 illustrate how a mover weak boundary may be generated.

In the drawings, like reference numbers generally indicate identical or similar elements. Additionally, generally, the left-most digit(s) of a reference number identifies the drawing in which the reference number first appears.

DETAILED DESCRIPTION

Figure 1:
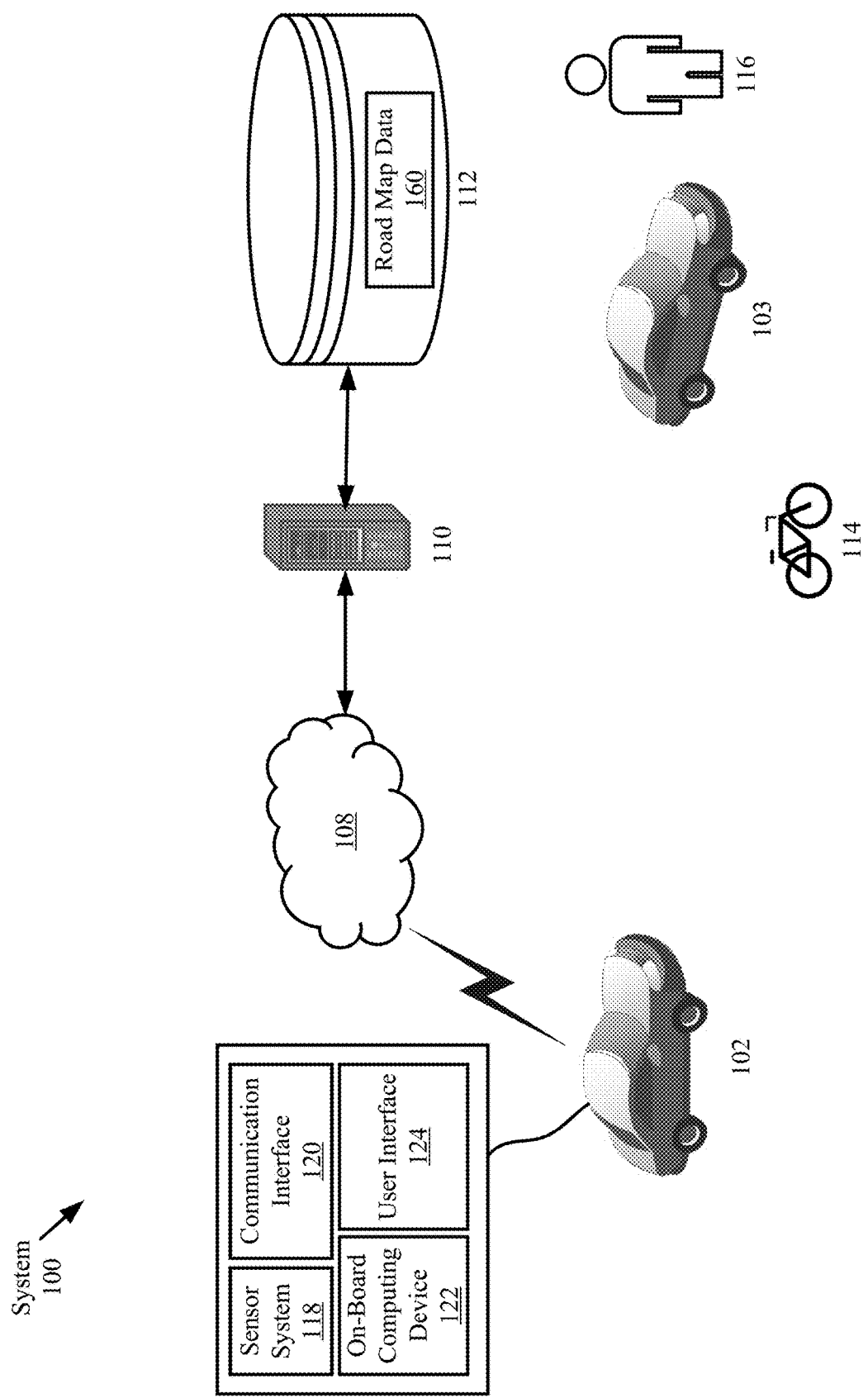
FIG. 1 illustrates a system in accordance with aspects of the disclosure.

This document describes system, apparatus, device, method and/or computer program product embodiments, and/or combinations and sub-combinations of any of the above, for deweighting veering margins based on crossing time. This feature of the present solution addresses the above-stated issues with conventional solutions to provide improved AV control for veering or otherwise traveling around detected moving objects (for example, other vehicles, pedestrians, and/or cyclists).

The present solution builds strong and weak boundaries around a detected moving object that is following a predicted trajectory based on crossing time, in order to improve an AV's veering around the detected moving object. For a crossing time greater than a threshold time, the AV may generate only a weak boundary around the detected moving object and maintain its current trajectory. In contrast, for a crossing time less than the threshold time, the AV may generate a strong boundary around the detected moving object (in addition the weak boundary) and adjust its trajectory based on the strong boundary.

The methods generally involve: obtaining a vehicle trajectory for the vehicle and a possible object trajectory for a moving object; analyzing the vehicle trajectory and the possible object trajectory to identify a time interval in which a footprint of the vehicle overlaps laterally with a footprint of the object; generating a mover raw margin in the time interval by shifting the footprint of the vehicle laterally until contact is made with the footprint of the object; obtaining a crossing time associated with each point in the mover raw margin; and generating a mover strong boundary by laterally shifting points of the mover raw margin in the direction towards the vehicle when the crossing times associated with the points are equal to or less than a threshold time. Each crossing time comprises a time at which the vehicle is lateral to the moving object at a location of a respective point in the mover raw margin.

In some embodiments, the methods also involve: expanding the mover raw margin in time and distance to generate a vehicle veering margin; generating a mover weak boundary by laterally shifting the vehicle veering margin in a direction towards the vehicle by a first amount that is greater than a second amount by which the point of the mover raw margin is laterally shifted to generate the mover strong boundary; computing crossing times for points in the vehicle veering margin based on the mover raw margin; and using the crossing times associated with the vehicle veering margin to scale weights for the mover weak boundary. The crossing time for each point in the vehicle veering margin, which is located before a start point of the mover raw margin, is set equal to a time associated with the start point of the mover raw margin. The crossing time for each point in the vehicle veering margin, which is located after an end point of the mover raw margin, is set equal to a time associated with the end point of the mover raw margin. The weights for the mover weak boundary reflect an incentive for the vehicle to react to the mover weak boundary.

The methods may further involve: generating a lateral vehicle trajectory for the vehicle to follow based on the mover strong boundary, the mover weak boundary, and/or the weights; and causing the vehicle to follow the lateral vehicle trajectory. A constant weight is assigned to the mover strong boundary which reflects an incentive to avoid reaching a minimum distance from the object.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Definitions for additional terms that are relevant to this document are included at the end of this Detailed Description.

Notably, this document describes the present solution in the context of an AV. However, the present solution is not limited to AV applications. The present solution may be used in other applications such as robotic applications, radar system applications, metric applications, and/or system performance applications.

FIG. 1 illustrates an example system 100, in accordance with aspects of the disclosure. System 100 comprises a vehicle 102 that is traveling along a road in a semi-autonomous or autonomous manner. Vehicle 102 is also referred to in this document as AV 102. AV 102 can include, but is not limited to, a land vehicle (as shown in FIG. 1), an aircraft, or a watercraft. As noted above, except where specifically noted this disclosure is not necessarily limited to AV embodiments, and it may include non-autonomous vehicles in some embodiments.

AV 102 is generally configured to detect objects in its proximity. The objects can include, but are not limited to, a vehicle 103, cyclist 114 (such as a rider of a bicycle, electric scooter, motorcycle, or the like) and/or a pedestrian 116.

As illustrated in FIG. 1, the AV 102 may include a sensor system 118, an on-board computing device 122, a communications interface 120, and a user interface 124. Autonomous vehicle system may further include certain components (as illustrated, for example, in FIG. 2) included in vehicles, which may be controlled by the on-board computing device 122 using a variety of communication signals and/or commands, such as, for example, acceleration signals or commands, deceleration signals or commands, steering signals or commands, braking signals or commands, etc.

The sensor system 118 may include one or more sensors that are coupled to and/or are included within the AV 102. For example, such sensors may include, without limitation, a lidar system, a radio detection and ranging (radar) system, a laser detection and ranging (LADAR) system, a sound navigation and ranging (sonar) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IMU), etc.), humidity sensors, occupancy sensors, or the like. The sensor data can include information that describes the location of objects within the surrounding environment of the AV 102, information about the environment itself, information about the motion of the AV 102, information about a route of the vehicle, or the like. As AV 102 travels over a surface, at least some of the sensors may collect data pertaining to the surface.

The AV 102 may also communicate sensor data collected by the sensor system to a remote computing device 110 (for example, a cloud processing system) over communications network 108. Remote computing device 110 may be configured with one or more servers to perform one or more processes of the technology described in this document. Remote computing device 110 may also be configured to communicate data/instructions to/from AV 102 over network 108, to/from server(s) and/or datastore(s) 112. Datastore(s) 112 may include, but are not limited to, database(s).

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from datastore 112. Datastore 112 may be configured to store and supply raw data, indexed data, structured data, road map data 160, program instructions or other configurations as is known.

The communications interface 120 may be configured to allow communication between AV 102 and external systems, such as, for example, external devices, sensors, other vehicles, servers, data stores, databases, etc. The communications interface 120 may utilize any now or hereafter known protocols, protection schemes, encodings, formats, packaging, etc. such as, without limitation, Wi-Fi, an infrared link, Bluetooth, etc. The user interface system 124 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 120 over communication links such as those known as vehicle-to-vehicle, vehicle-to-object or other V2X communication links. The term "V2X" refers to a communication between a vehicle and any object that the vehicle may encounter or affect in its environment.

Figure 2:
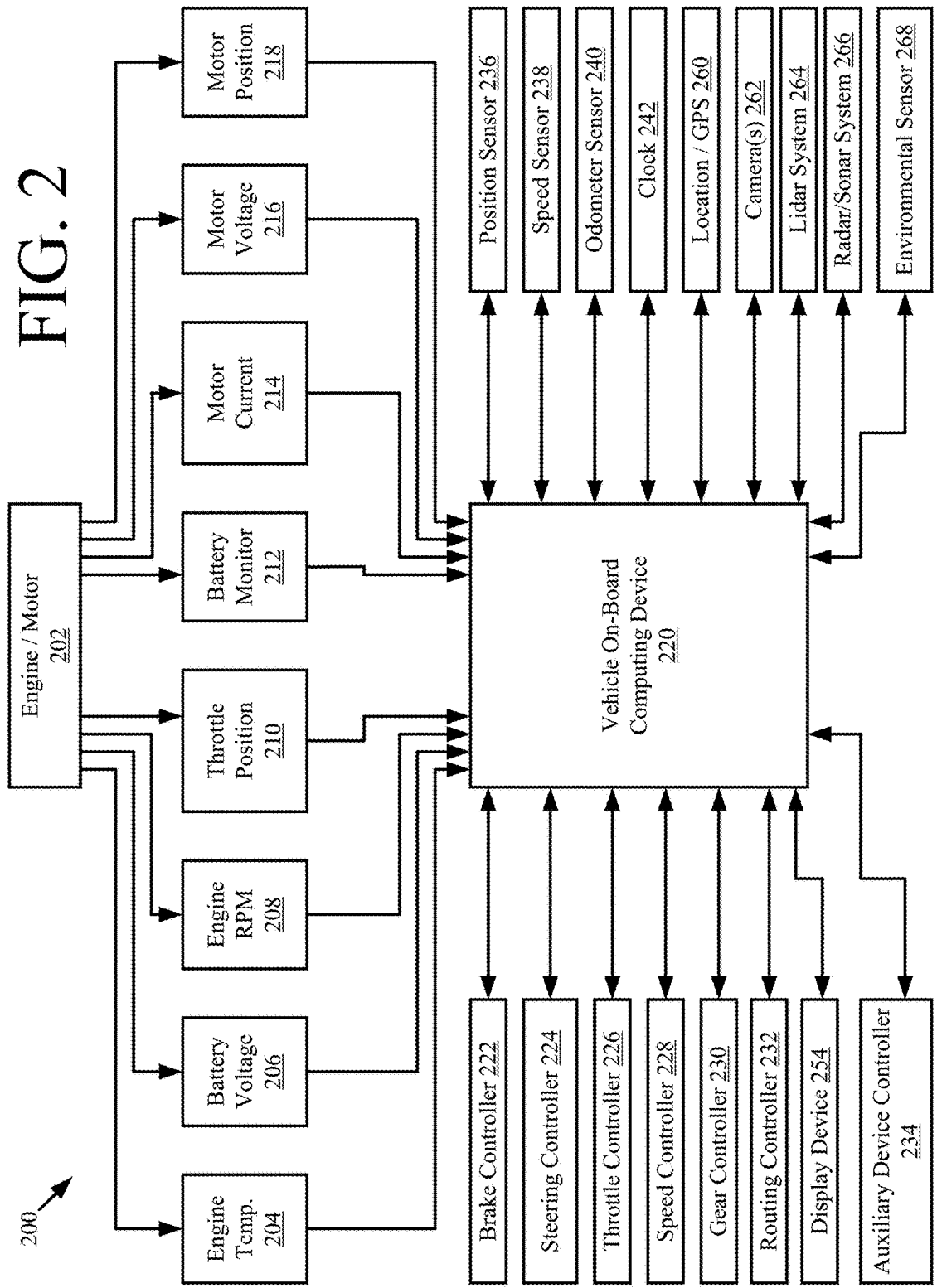
FIG. 2 illustrates an example architecture for a vehicle, in accordance with aspects of the disclosure.

FIG. 2 illustrates an example system architecture 200 for a vehicle, in accordance with aspects of the disclosure. Vehicles 102 and/or 103 of FIG. 1 can have the same or similar system architecture as that shown in FIG. 2. Thus, the following discussion of system architecture 200 is sufficient for understanding vehicle(s) 102, 103 of FIG. 1. However, other types of vehicles are considered within the scope of the technology described in this document and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 for a vehicle includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine revolutions per minute (RPM) sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 260 (such as a Global Positioning System (GPS) device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 220. The vehicle on-board computing device 220 may be implemented using the computer system of FIG. 18. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 234 may be configured to control one or more auxiliary devices, such as testing systems, auxiliary sensors, mobile devices transported by the vehicle, etc.

Geographic location information may be communicated from the location sensor 260 to the vehicle on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the vehicle on-board computing device 220. The object detection information and/or captured images are processed by the vehicle on-board computing device 220 to detect objects in proximity to the vehicle. Any known or to be known technique for making an object detection based on sensor data and/or captured images can be used in the embodiments disclosed in this document.

Lidar information is communicated from lidar system 264 to the vehicle on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle. The manner in which the object detections are made by the vehicle on-board computing device 220 includes such capabilities detailed in this disclosure.

In addition, the system architecture 200 may include an onboard display device 254 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 220 may include and/or may be in communication with a routing controller 232 that generates a navigation route from a start position to a destination position for an autonomous vehicle. The routing controller 232 may access a map data store to identify possible routes and road segments that a vehicle can travel on to get from the start position to the destination position. The routing controller 232 may score the possible routes and identify a preferred route to reach the destination. For example, the routing controller 232 may generate a navigation route that minimizes Euclidean distance traveled or other cost function during the route, and may further access the traffic information and/or estimates that can affect an amount of time it will take to travel on a particular route. Depending on implementation, the routing controller 232 may generate one or more routes using various routing methods, such as Dijkstra's algorithm, Bellman-Ford algorithm, or other algorithms. The routing controller 232 may also use the traffic information to generate a navigation route that reflects expected conditions of the route (for example, current day of the week or current time of day, etc.), such that a route generated for travel during rush-hour may differ from a route generated for travel late at night. The routing controller 232 may also generate more than one navigation route to a destination and send more than one of these navigation routes to a user for selection by the user from among various possible routes.

In various embodiments, the vehicle on-board computing device 220 may determine perception information of the surrounding environment of the AV. Based on the sensor data provided by one or more sensors and location information that is obtained, the vehicle on-board computing device 220 may determine perception information of the surrounding environment of the AV. The perception information may represent what an ordinary driver would perceive in the surrounding environment of a vehicle. The perception data may include information relating to one or more objects in the environment of the AV. For example, the vehicle on-board computing device 220 may process sensor data (for example, lidar or radar data, camera images, etc.) in order to identify objects and/or features in the environment of AV. The objects may include traffic signals, roadway boundaries, other vehicles, pedestrians, and/or obstacles, etc. The vehicle on-board computing device 220 may use any now or hereafter known object recognition algorithms, video tracking algorithms, and computer vision algorithms (for example, track objects frame-to-frame iteratively over a number of time periods) to determine the perception.

In some embodiments, the vehicle on-board computing device 220 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The vehicle on-board computing device 220 may perform one or more prediction and/or forecasting operations. For example, the vehicle on-board computing device 220 may predict future locations, trajectories, and/or actions of one or more objects. For example, the vehicle on-board computing device 220 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the AV, the surrounding environment, and/or their relationship(s). For example, if an object is a vehicle and the current driving environment includes an intersection, the vehicle on-board computing device 220 may predict whether the object will likely move straight forward or make a turn. If the perception data indicates that the intersection has no traffic light, the vehicle on-board computing device 220 may also predict whether the vehicle may have to fully stop prior to entering the intersection.

In various embodiments, the vehicle on-board computing device 220 may determine a motion plan for the autonomous vehicle. For example, the vehicle on-board computing device 220 may determine a motion plan for the autonomous vehicle based on the perception data and/or the prediction data. Specifically, given predictions about the future locations of proximate objects and other perception data, the vehicle on-board computing device 220 can determine a motion plan for the AV that best navigates the autonomous vehicle relative to the objects at their future locations.

In some embodiments, the vehicle on-board computing device 220 may receive predictions and make a decision regarding how to handle objects and/or actors in the environment of the AV. For example, for a particular actor (for example, a vehicle with a given speed, direction, turning angle, etc.), the vehicle on-board computing device 220 decides whether to overtake, yield, stop, and/or pass based on, for example, traffic conditions, map data, state of the autonomous vehicle, etc. Furthermore, the vehicle on-board computing device 220 also plans a path for the AV to travel on a given route, as well as driving parameters (for example, distance, speed, and/or turning angle). That is, for a given object, the vehicle on-board computing device 220 decides what to do with the object and determines how to do it. For example, for a given object, the vehicle on-board computing device 220 may decide to pass the object and may determine whether to pass on the left side or right side of the object (including motion parameters such as speed). The vehicle on-board computing device 220 may also assess the risk of a collision between a detected object and the AV. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (for example, N milliseconds). If the collision can be avoided, then the vehicle on-board computing device 220 may execute one or more control instructions to perform a cautious maneuver (for example, mildly slow down, accelerate, change lane, or swerve). In contrast, if the collision cannot be avoided, then the vehicle on-board computing device 220 may execute one or more control instructions for execution of an emergency maneuver (for example, brake and/or change direction of travel).

As discussed above, planning and control data regarding the movement of the autonomous vehicle is generated for execution. The vehicle on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
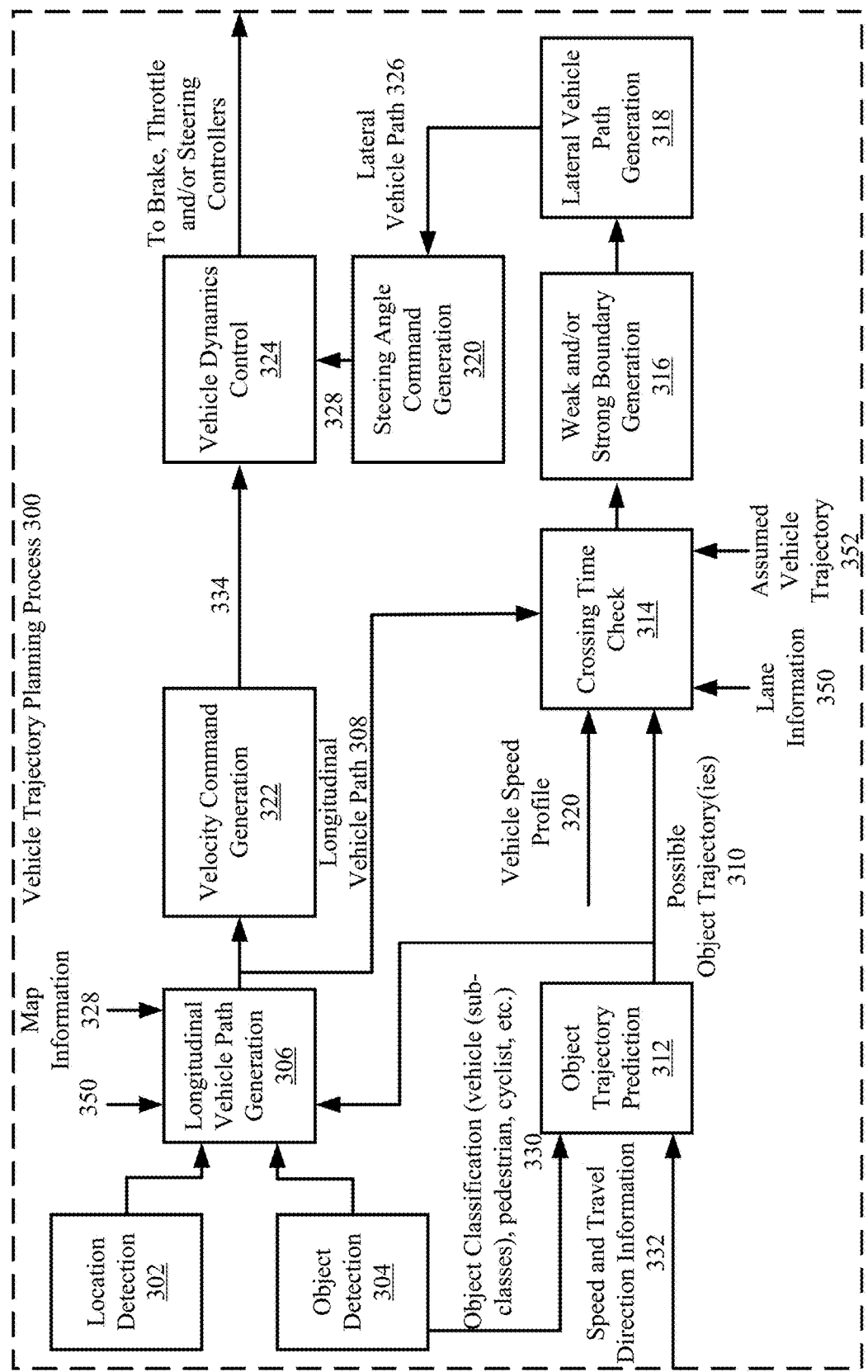
FIG. 3 illustrates how a vehicle may be controlled in accordance with aspects of the disclosure.

FIG. 3 provides a block diagram that is useful for understanding how control of a vehicle is achieved in accordance with the present solution. All of the operations performed in blocks 302-306, 312-324 can be performed by the on-board computing device of a vehicle (for example, AV 102 of FIG. 1).

In block 302, a location of the vehicle is detected. This detection can be made based on sensor data output from a location sensor (for example, location sensor 260 of FIG. 2) of the vehicle. This sensor data can include, but is not limited to, GPS data. The detected location of the vehicle is then passed to block 306.

In block 304, an object is detected within proximity of the vehicle. This detection is made based on sensor data output from one or more sensors (for example, sensor(s) 260-268 of FIG. 2) of the vehicle. Information about the detected object is passed to block 306. This information includes, but is not limited to, a speed of the object and/or a direction of travel of the object.

In block 306, a longitudinal vehicle path 308 is generated using the information from blocks 302, 304, map information 328 which is pre-stored in a data store of the vehicle), lane information 350, and object trajectory prediction(s) (for example, possible object trajectory(ies) 310 from block 312). Any known or to be known technique for determining a longitudinal vehicle path can be used here. The manner in which the possible object trajectory(ies) 310 are generated in block 312 will be discussed below. The longitudinal vehicle path 308 represents a smooth path that does not have abrupt changes that would otherwise provide passenger discomfort.

The longitudinal vehicle path 308 is then provided to blocks 314 and 322. In block 322, a velocity command 334 is generated based on the longitudinal vehicle path 308. Any known or to be known technique for generating a velocity command can be used here. The velocity command 334 is provided to block 324 for vehicle dynamics control.

Notably, the present solution augments a vehicle trajectory planning process 300 by adding additional operations of block 314, 316 in the lateral vehicle path generation branch. The additional operations of block 314, 316 optimize the lateral vehicle path for improved veering around detected moving objects (for example, a cyclist or another vehicle).

As shown in FIG. 3, an object classification is performed in block 304 to classify the detected object into one of a plurality of classes and/or sub-classes. The classes can include, but are not limited to, a vehicle class and a pedestrian class. The vehicle class can have a plurality of vehicle sub-classes. The vehicle sub-classes can include, but are not limited to, a bicycle sub-class, a motorcycle sub-class, a skateboard sub-class, a roller blade sub-class, a scooter sub-class, a sedan sub-class, an SUV sub-class, and/or a truck sub-class. The object classification is made based on sensor data output from sensor(s) of the vehicle. Any known or to be known object classification technique can be used here. Information 330 specifying the object's classification is provided to block 312, in addition to the information 332 indicating the object's actual speed and direction of travel.

Block 312 involves determining one or more possible object trajectories for the object detected in 304. The possible object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. The one or more possible object trajectories 310 is(are) then passed to block 314 in addition to block 306 as mentioned above.

In scenarios where the object is moving in a direction opposite to the direction in which the AV is moving, operations may optionally be performed in block 312 to select possible object trajectory(ies) that cause(s) the moving object to decelerate to a stop. The selected possible object trajectory(ies) is(are) then passed to blocks 306 and 314.

In the case that two or more possible object trajectories are determined, then 312 may optionally also involve selecting one of the possible object trajectories which provides a worst-case crossing scenario for the AV. This determination is made based on information 332 indicating the AV's actual speed and direction of travel. The selected possible object trajectory is then passed to block 314, instead of all the possible object trajectories determined in 312.

In block 314, operations are performed to check whether crossing time(s) exceed(s) a threshold value. A crossing time is a time at which the AV and detected moving object are predicted to laterally cross each other's paths if the vehicle follows an assumed vehicle trajectory and the object follows the possible object trajectory 310. A vehicle speed profile 320, lane information 350 and an assumed vehicle trajectory 352 are used to compute the crossing time. The vehicle speed profile 320 comprises at least one speed of the vehicle which was obtained from sensor data and/or from a vehicle trajectory the AV is currently following. The threshold value can be any number selected in accordance with a given application. For example, in some scenarios, the threshold value is any number between 1-10 seconds. The present solution is not limited in this regard.

If the crossing time exceeds the threshold value, then a mover weak boundary is generated in block 316 and a lateral vehicle path 326 is generated in block 318 based on the mover weak boundary. It should be noted that the mover weak boundary is generated regardless of crossing time which will become evident as the discussion progresses. The manner in which the mover weak boundary is generated will become evident as the discussion progresses. Any known or to be known technique for generating a lateral vehicle path can be used here. The lateral vehicle path 326 is then passed to block 320. In block 320, a steering angle command 328 is generated based on the lateral vehicle path 326. Any known or to be known technique for generating a steering angle command can be used here. The steering angle command 328 is provided to block 324 for vehicle dynamics control. The vehicle dynamics control may cause the vehicle to follow the vehicle trajectory defined by the longitudinal vehicle path 308 and the lateral vehicle path 326.

In contrast, if the crossing time is equal to or less than the threshold value, then a mover strong boundary is generated in block 316 in addition to the mover weak boundary. The manner in which the mover strong boundary is generated will become evident as the discussion progresses. The lateral vehicle path 326 is generated in block 318 based on the mover weak boundary and adjusted based on the mover strong boundary. The lateral vehicle path 326 is then passed to block 320. In block 320, a steering angle command 328 is generated based on the lateral vehicle path 326. Any known or to be known technique for generating a steering angle command can be used here. The steering angle command 328 is provided to block 324 for vehicle dynamics control. The vehicle dynamics control may cause the vehicle to follow the vehicle trajectory defined by the longitudinal vehicle path 308 and the lateral vehicle path 326.

Once the lateral vehicle path 326 is generated, the operations of blocks 306, 312-318 may be repeated using the vehicle trajectory defined by the longitudinal vehicle path 308 and the lateral vehicle path 326 as opposed to the assumed vehicle trajectory. The lateral vehicle path generated during the second iteration of the operations in blocks 306, 312-318 may then be provided to block 320.

Figure 4:
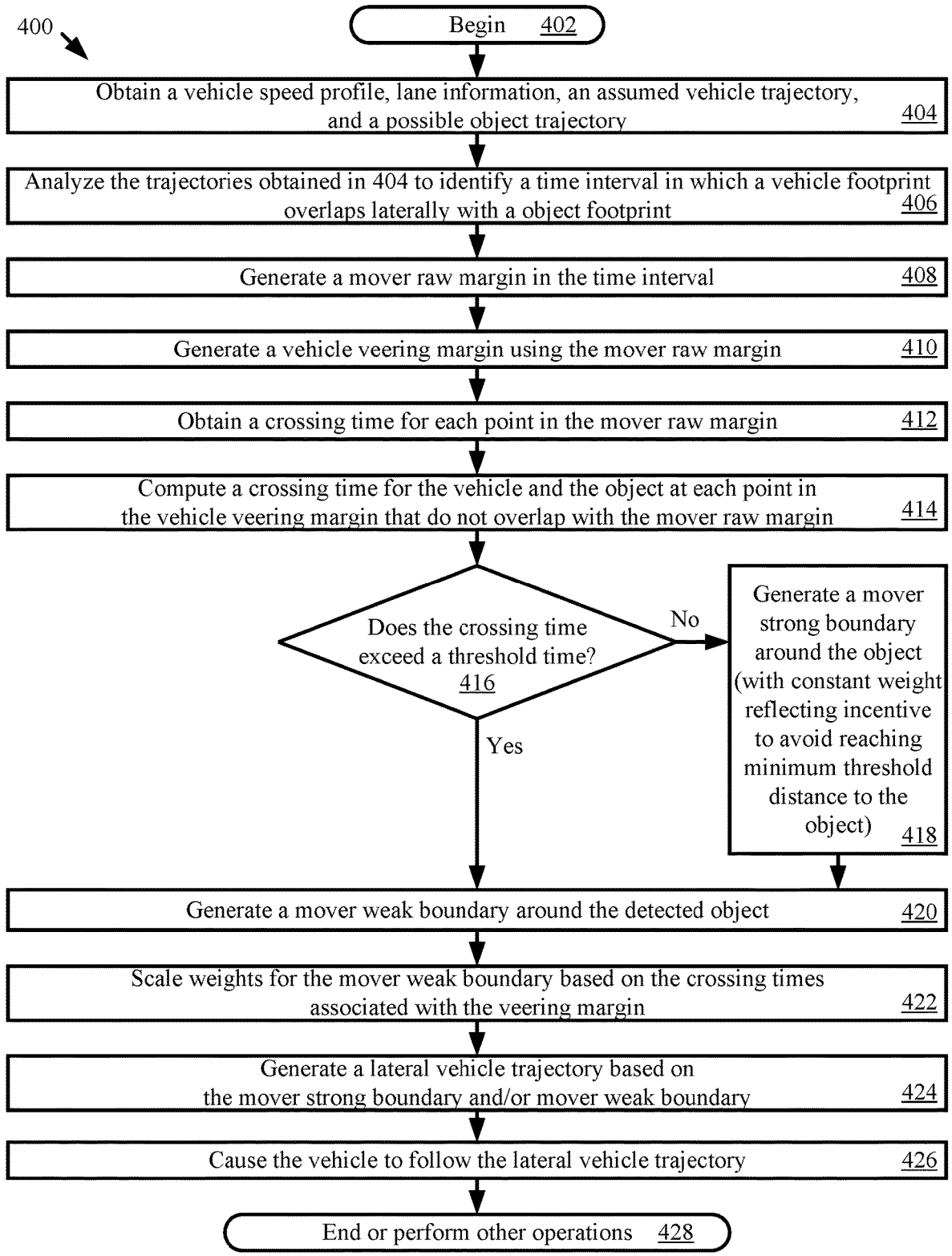
FIG. 4 illustrates a method for operating a vehicle.

FIG. 4 provides a flow diagram of an illustrative method 400 for controlling an AV (for example, AV 102 of FIG. 1). All or some of the operations of method 400 can be performed by an onboard computing device (for example, onboard computing device 122 of FIGS. 1 and/or 220 of FIG. 2) of the AV and/or a remote computing device (for example, server 110 of FIG. 1). Some of the operations of method 400 can be performed in a different order than that shown in FIG. 4 in accordance with a given application of the present solution.

Figure 5:
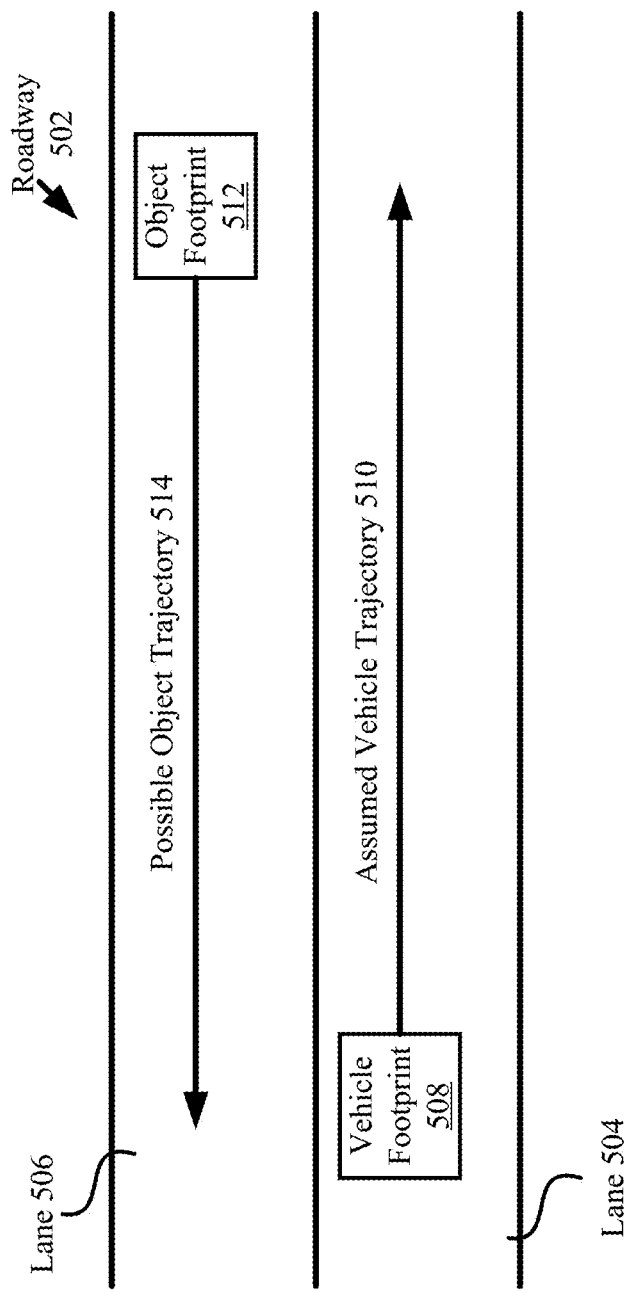
FIG. 5 illustrates an assumed vehicle trajectory and a possible object trajectory.

Method 400 begins with 402 and continues with 404 where a vehicle speed profile (for example, vehicle speed profile 320 of FIG. 3), lane information (for example, lane information 350 of FIG. 3), an assumed vehicle trajectory (for example, assumed vehicle trajectory 352 of FIG. 3), and a possible object trajectory (for example, possible object trajectory 310 of FIG. 3) are obtained. The assumed vehicle trajectory may be that the vehicle is traveling along a path aligned with the center of the lane. An illustrative assumed vehicle trajectory 510 is shown in FIG. 5, along with an illustrative possible object trajectory 514. The lane information indicates that the vehicle is traveling in the center of the lane 504 of a roadway 502 while the detected object is traveling in an adjacent lane 506 of the roadway. The present solution is not limited to the particulars of FIG. 5.

Figure 6:
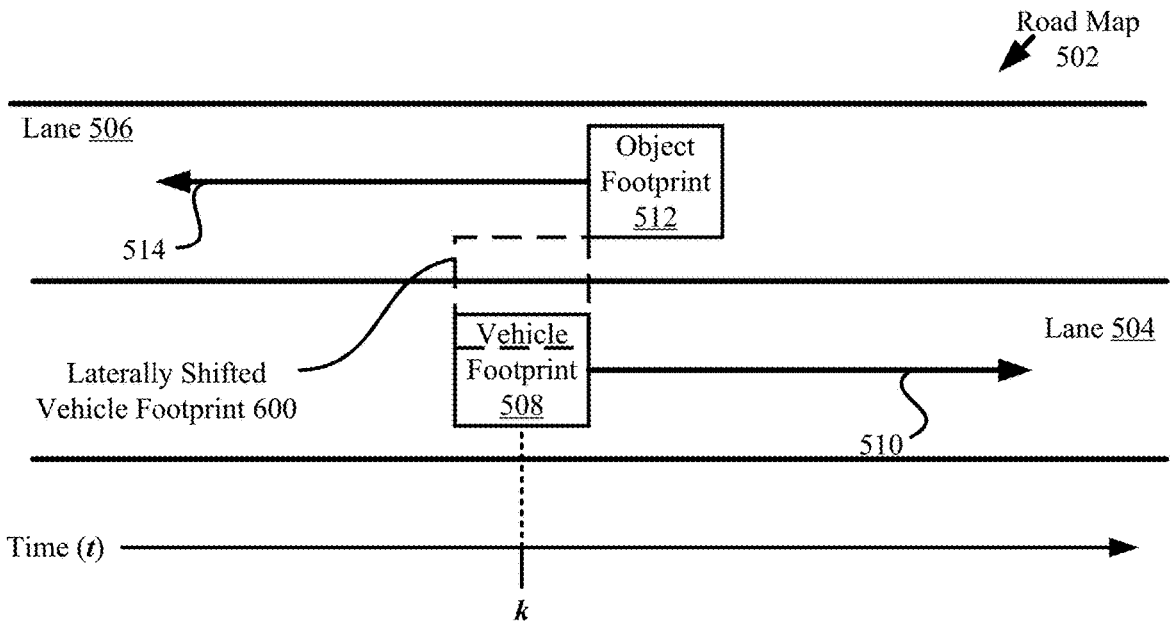
FIGS. 6-7 illustrates how a time interview may be obtained.
Figure 7:
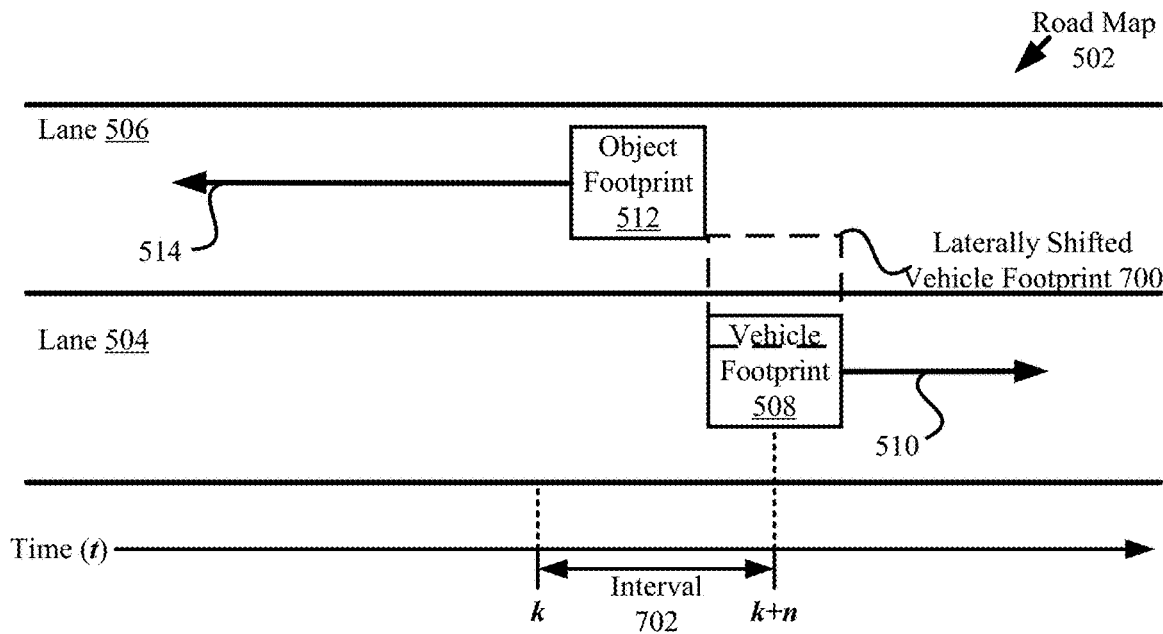

Referring again to FIG. 4, method 400 continues with 406 where the computing device or processor analyzes the trajectories (for example, trajectories 510, 514 of FIG. 5) to identify a time interval in which a vehicle footprint overlaps laterally with an object footprint. An illustrative time interval 702 is shown in FIG. 7 with a start time k and an end time k+n. The start time k is the first time at which the vehicle footprint 508 overlaps laterally with the object footprint 512 as shown in FIG. 6, while the end time k+n is the last time at which the vehicle footprint 508 overlaps laterally with the object footprint 512 as shown in FIG. 7. The lateral overlapping is determined by laterally shifting the vehicle footprint until the laterally shifted vehicle footprint 600, 700 comes in contact with the object footprint 512 as shown in FIGS. 6-7. The present solution is not limited to the particulars of FIGS. 6-7.

Figure 8:
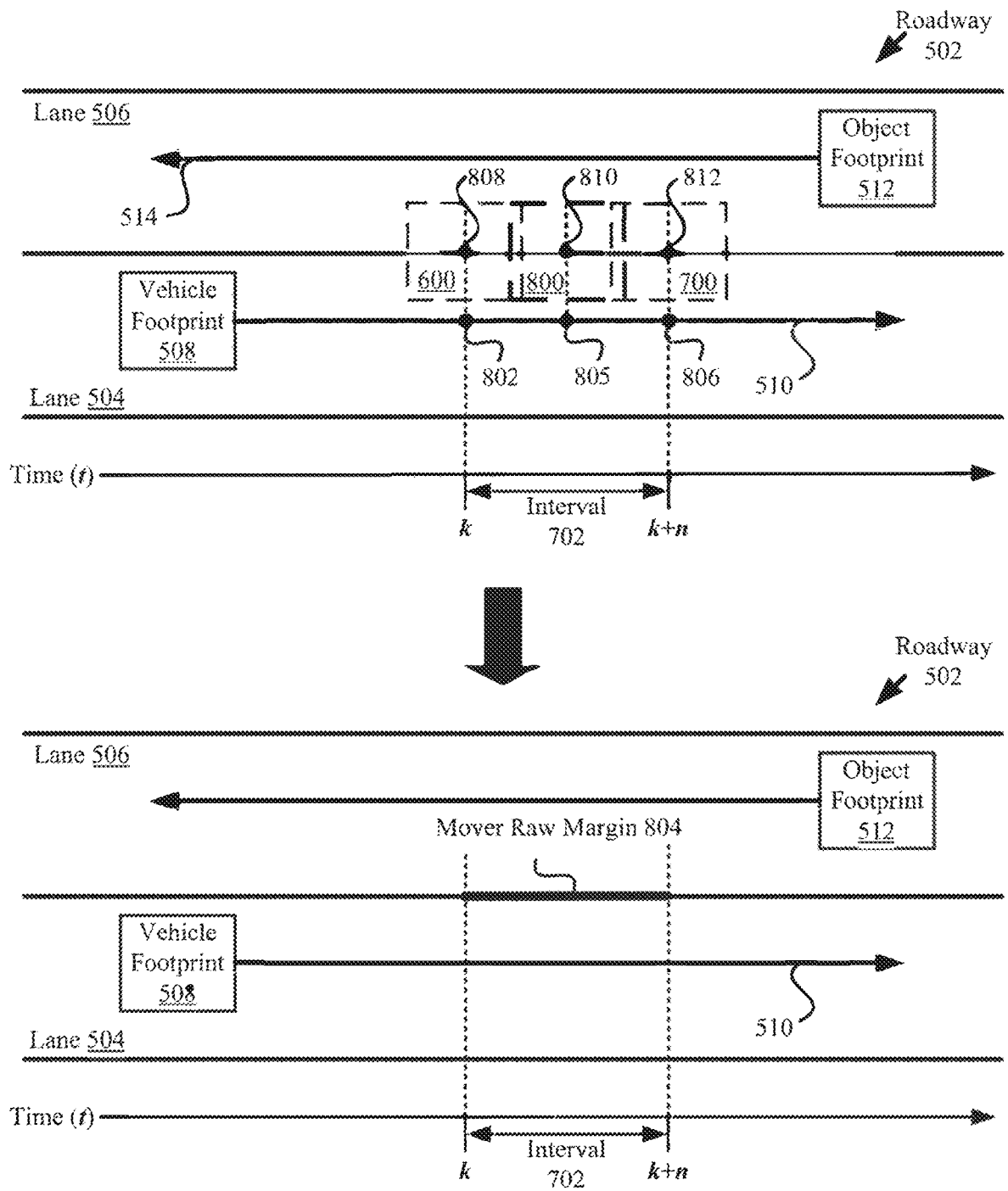
FIG. 8 illustrates how a mover raw margin may be generated.

Once the time interval is identified, a mover raw margin is generated in block 408 of FIG. 4. The mover raw margin is generated by laterally shifting the vehicle footprint along its heading at each point in the time interval until it intersects with the object footprint. The mover raw margin is defined by a sequence of the vehicle's center of gravity (CoG) at the vehicle footprint's laterally shifted locations. An illustrative mover raw margin 804 is shown in FIG. 8. There are three points 802, 805, 806 in the time interval 702. The vehicle footprint 508 is laterally shifted at each point 802, 805, 806 in a direction towards the object footprint 512 until the vehicle footprint comes in contact with the object footprint. The laterally shifted vehicle footprint 600 is associated with point 802. The vehicle's CoG at the location of the laterally shifted vehicle footprint 600 is shown by dot 808. The laterally shifted vehicle footprint 800 is associated with point 805, and the vehicle's CoG at the location of the laterally shifted vehicle footprint 800 is shown by dot 810. The laterally shifted vehicle footprint 700 is associated with point 806, and the vehicle's CoG at the location of the laterally shifted vehicle footprint 700 is shown by dot 812. The mover raw margin 804 is defined by a line passing through points 808, 810, 812. The present solution is not limited to the particulars of FIG. 8.

Figure 9:
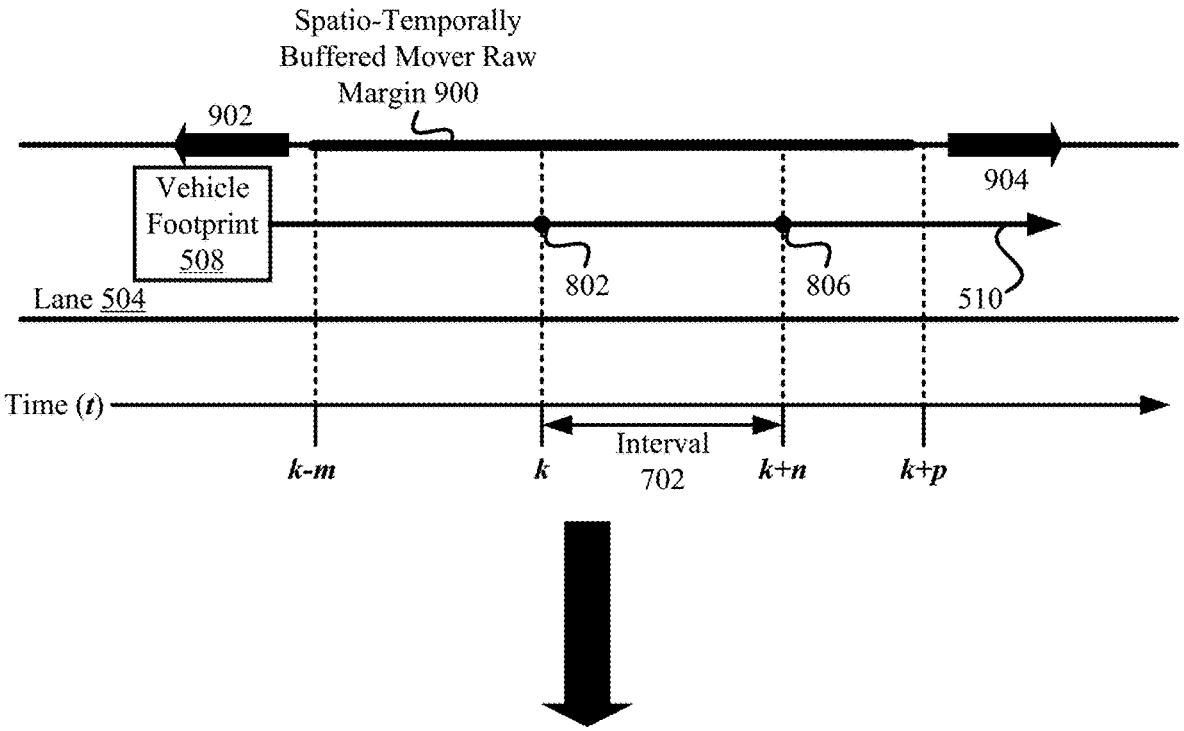
FIG. 9 illustrates how a vehicle veering margin may be generated.
Figure 9:
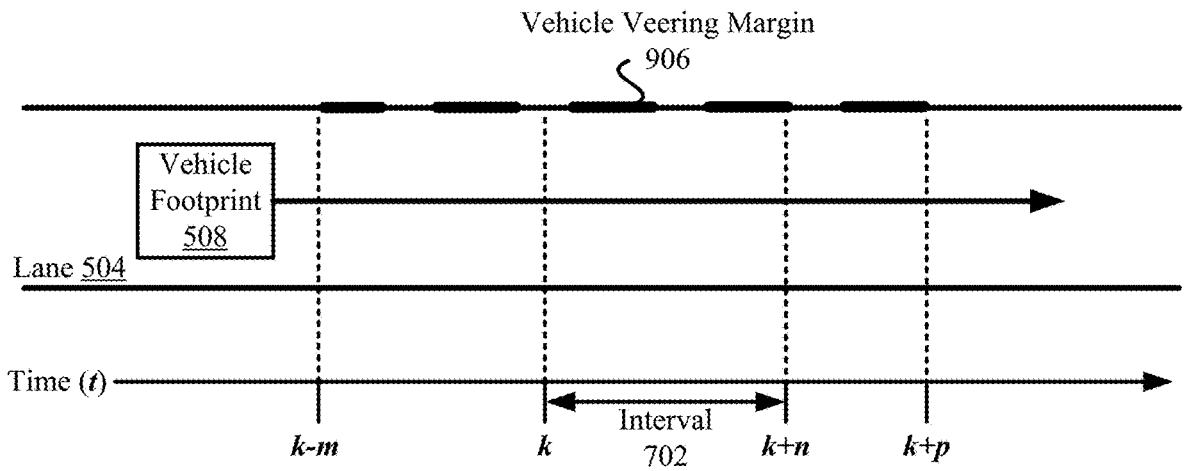

With reference once again to FIG. 4, method 400 continues with 410 where a vehicle veering margin is generated using the mover raw margin. More specifically, the mover raw margin is spatio-temporally buffered to generate the vehicle veering margin. An illustrative vehicle veering margin 906 is shown in FIG. 9. The vehicle veering margin 906 is generated by expanding the mover raw margin in time and distance in direction 902 before its start point 802 and in direction 904 after its end point 806 to define a spatio-temporally buffered mover raw margin 900. The amount of expansion in directions 902, 904 may be pre-defined (for example, 1-5 meters or 1-5 seconds). The amount of expansion in directions 902, 904 may be different as shown in FIG. 9 or the same (not shown). For example, the mover raw margin is temporally expanded in direction 902 by time m and temporally expanded in direction 904 by time p, where m and p are different from each other. The vehicle veering margin 906 is then set equal to the spatio-temporally buffered mover raw margin 900. The present solution is not limited to the particulars of FIG. 9.

After generation of the vehicle veering margin, the system performs operations in 412 of FIG. 4 to obtain crossing times for each point in the mover raw margin. Each of these crossing times refers to a time at which the vehicle is first lateral to the detected object at a location of a respective point in the mover raw margin. Illustrative crossing times associated with the mover raw margin are shown in graph 1000 of FIG. 10. These crossing times fall between k and k+n and increase as the distance increases. The present solution is not limited to the particulars of FIG. 10.

Figure 10:
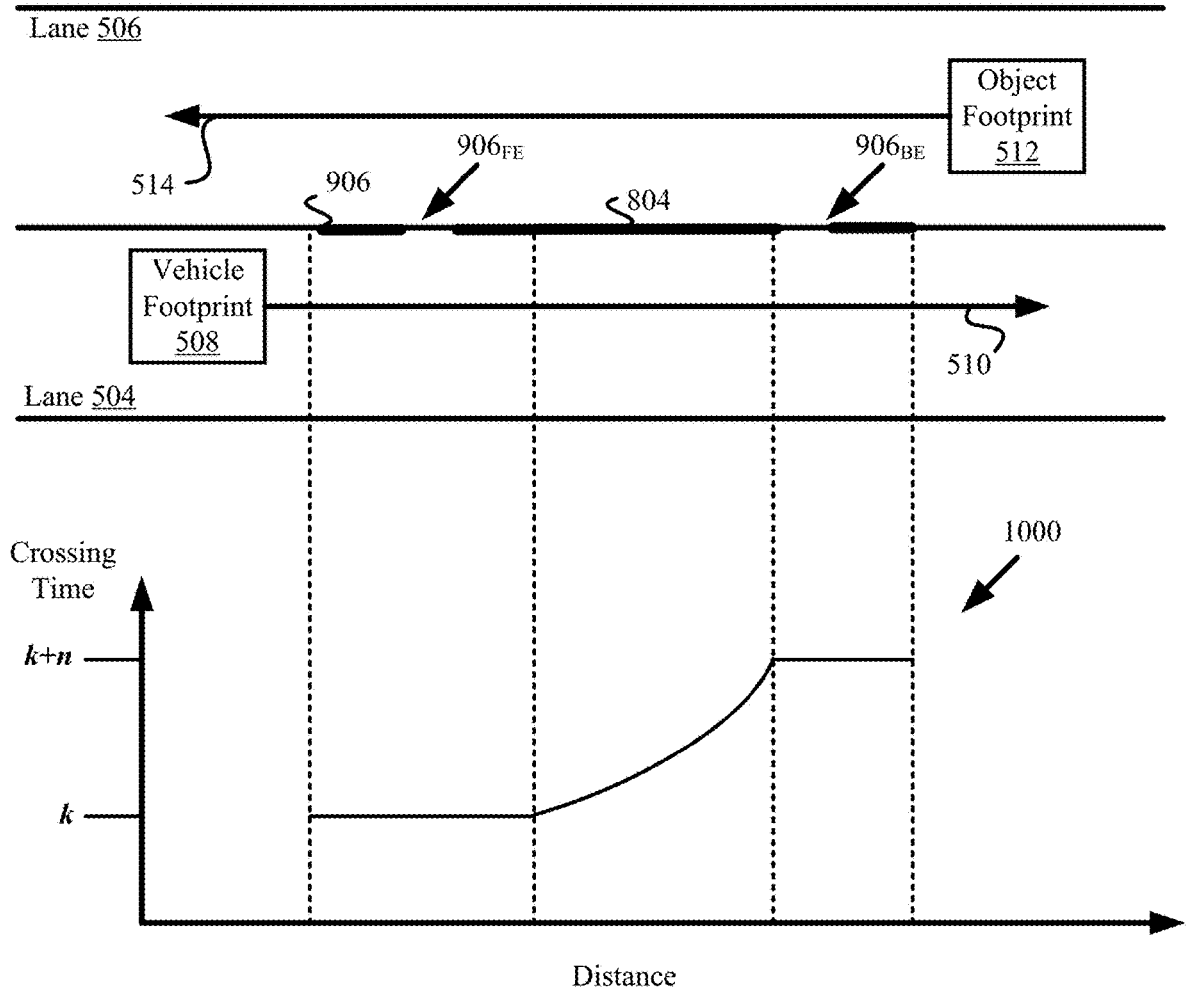
FIG. 10 illustrates crossing times for a vehicle and object in the mover raw margin and the vehicle veering margin.

Next in block 414 of FIG. 4, the system computes a crossing time for the vehicle and the detected object at each point in the vehicle veering margin that do not overlap with the mover raw margin. For all points in the vehicle veering margin located before the start point of the mover raw margin, the crossing time is equal to the time at which a start point of mover raw margin occurs. For all points in the vehicle veering margin located after the end point of the mover raw margin, the crossing time is equal to the time at which a last point of the mover raw margin occurs. Illustrative crossing times associated with the frontend and backend portions of the vehicle veering margin are shown in FIG. 10. The crossing times associated with the frontend portion $906_{FE}$ of the vehicle veering margin 906 are set equal to k, and the crossing times associated with the backend portion $906_{BE}$ of the vehicle veering margin 906 are set equal to k+n. The present solution is not limited to the particulars of FIG. 10.

In decision block 416 of FIG. 6, the crossing times are compared to a threshold time. The threshold time can be predefined and selected based on any given application. For example, the threshold time may be three seconds. The present solution is not limited to this example threshold time value.

Figure 11:
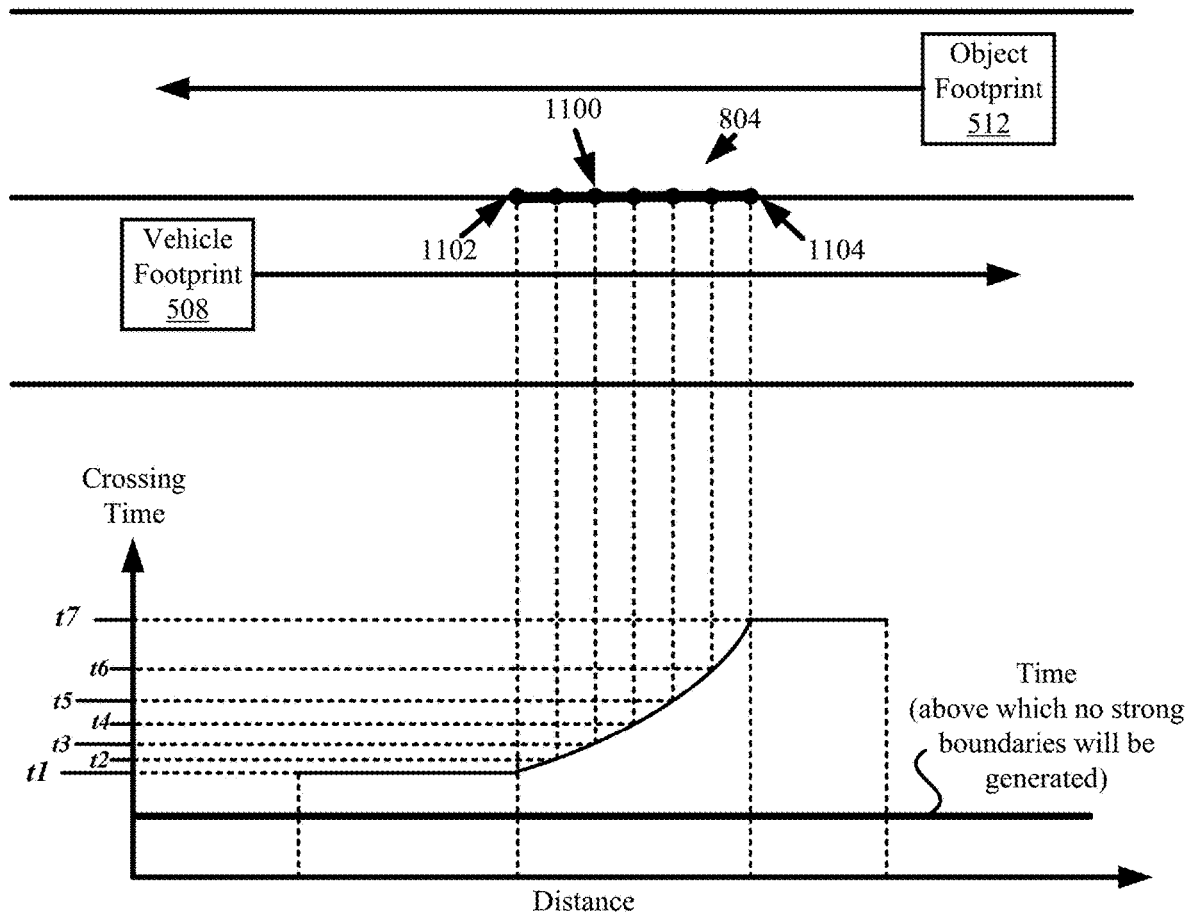
FIGS. 11-13 and 15 illustrate when and how a mover strong boundary may be generated.

If a crossing time is equal to or less than the threshold time [416:NO], then method 400 continues with 418 where a mover strong boundary around the detected object is generated. It should be noted that the mover strong boundary is not generated when the crossing times are greater than the threshold time. Such a scenario is illustrated in FIG. 11. Thus, if an interaction between the AV and a moving object occurs later in the time horizon, only a mover weak boundary will be generated for this moving object. Mover weak boundaries will be discussed in detail below. A strong boundary may also be generated for detected static and stationary objects over the entire planning time horizon.

The mover strong boundary is associated with a constant high weight (for example, 500.0) that reflects an incentive to avoid reaching a minimum distance from the object. The minimum distance can be predefined and selected based on any given application. For example, the minimum distance is two meters. The present solution is not limited to this example minimum distance value.

Figure 12:
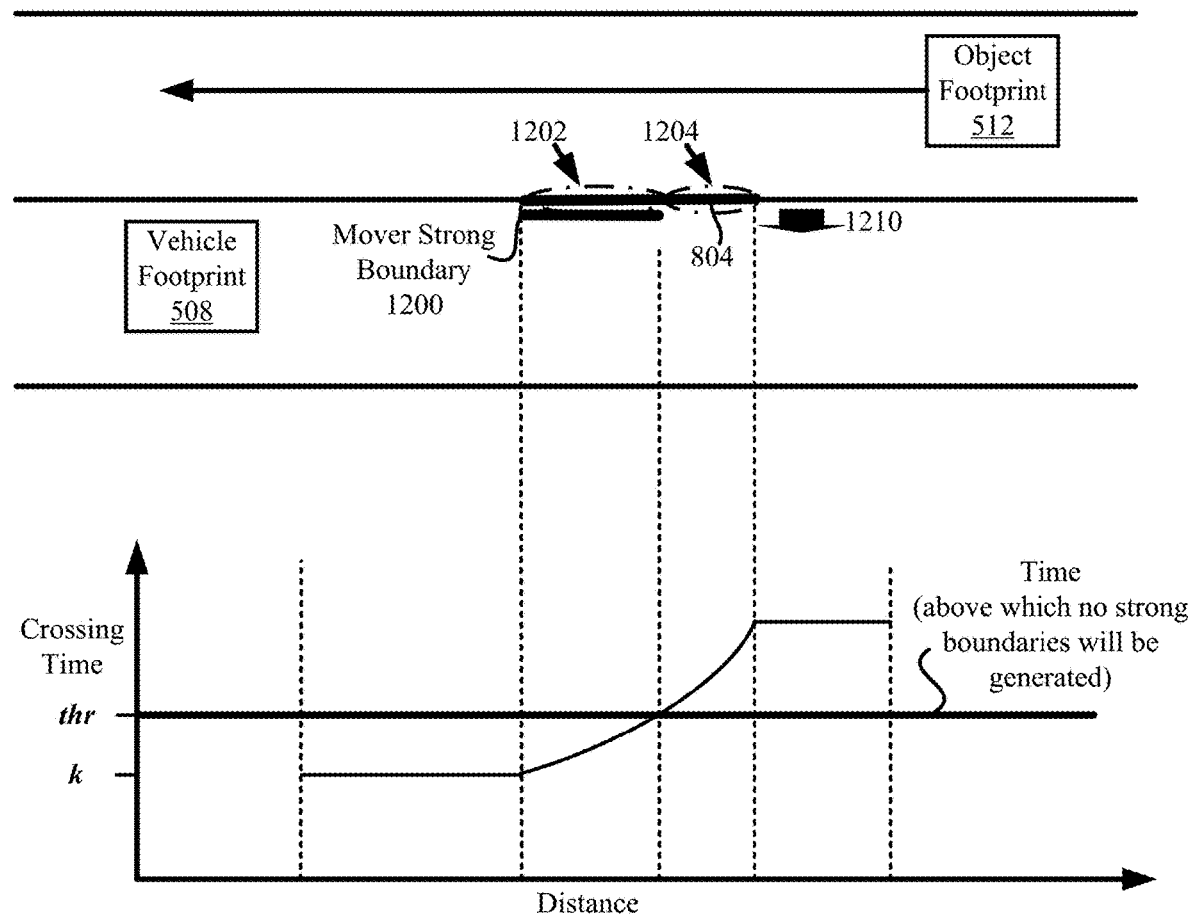
Figure 13:
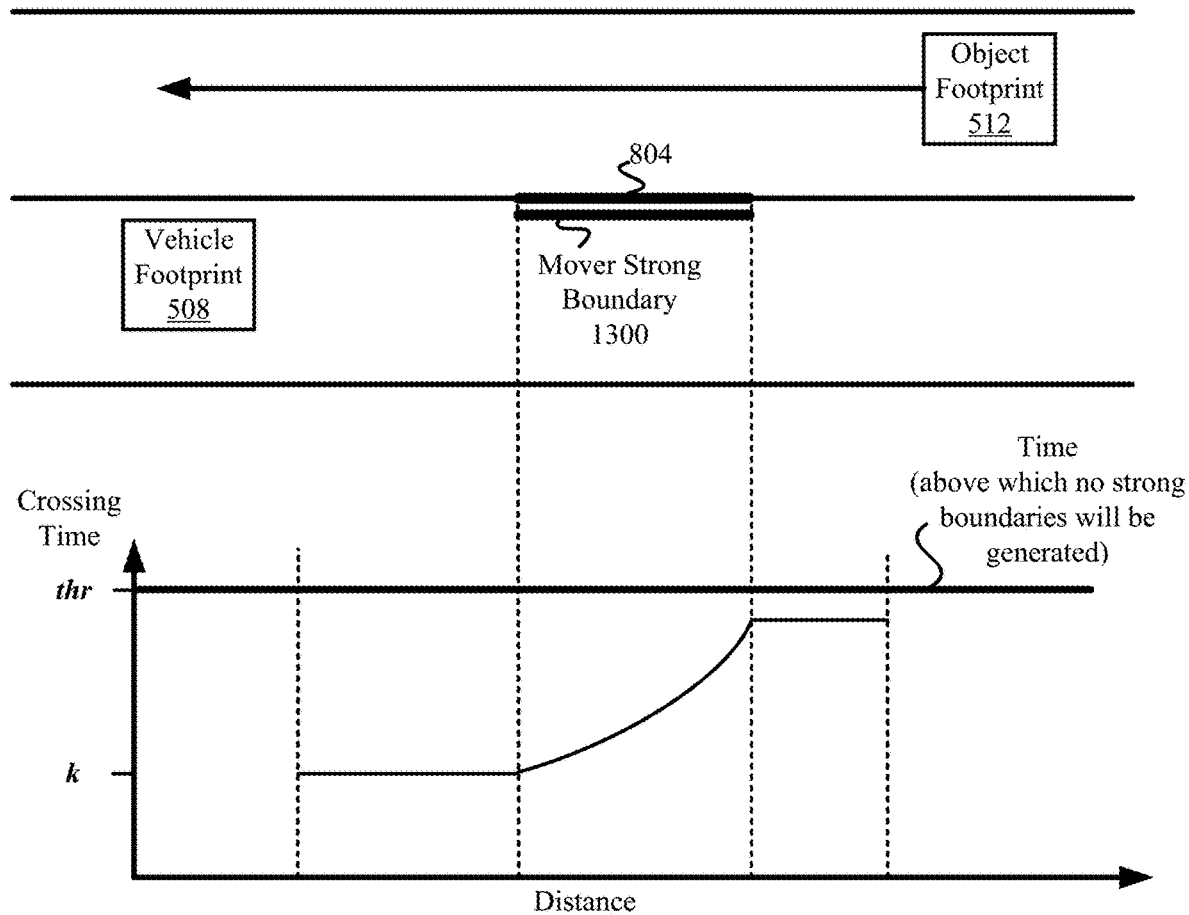

The mover strong boundary is generated by laterally buffering the mover raw margin at each point associated with a crossing time that is equal to or less than the threshold time. An illustrative mover strong boundary 1200 is shown in FIG. 12. The mover strong boundary 1200 is generated by laterally buffering portion 1202 of the mover raw margin 804 in direction 1210 by a predefined amount (for example, 1-2 meters). Portion 1202 is associated with the crossing times falling between k and threshold time thr. The remaining portion 1204 of the mover raw margin 804 is associated with crossing times that are greater than the threshold time thr. Thus, a mover strong boundary is not generated in relation to this remaining portion 1204. The present solution is not limited to the particulars of FIG. 12. Another mover strong boundary 1300 is shown in FIG. 13 which was generated for the entire mover raw margin 804 since every point of the mover raw margin 804 is associated with a crossing time less than the threshold time thr.

Figure 14:
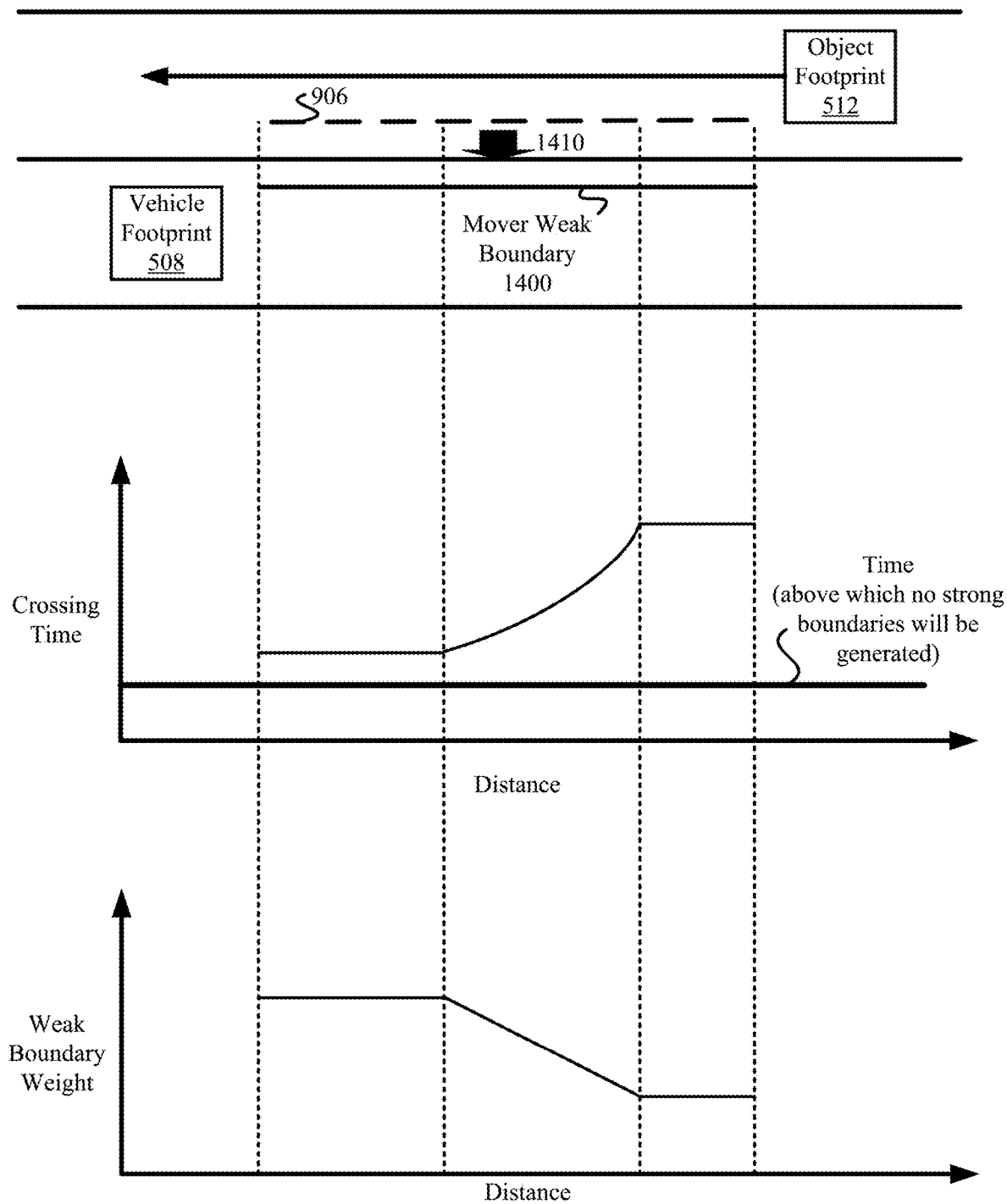

Referring again to FIG. 4, method 400 continues with 420 upon completing 418 and when the crossing time exceeds the threshold time [416: YES]. 410 involves generating a mover weak boundary around the detected object. As noted above, the mover weak boundary is generated regardless of crossing time. The mover weak boundary is generated by laterally buffering the vehicle veering margin. An illustrative mover weak boundary 1400 is shown in FIG. 14. The mover weak boundary 1400 is generated by buffering the vehicle veering margin 906 in direction 1410 by a predefined amount. The predefined amount used for generating the mover weak boundary is greater than the predefined amount used to generate the mover strong boundary. Both predefined amounts are configurable and can be changed over time manually or based on a machine learning model.

Next in 422, the system scales the weights for the mover weak boundary based on or as a function of the crossing times associated with the veering margin. These weights reflect an incentive for the vehicle to react to the mover weak boundary. Illustrative weights for the mover weak boundary are shown in FIG. 14. The longer the crossing time, the smaller the weight on the mover weak boundary will be. In some scenarios, a linear ramp function is used to scale the weights for the mover weak boundary. A different approach may be used that accounts for uncertainty of the object's position as a function of time. For example, there is relatively little uncertainty for a moving object that is traveling slow and coming to a stop.

Figure 16:
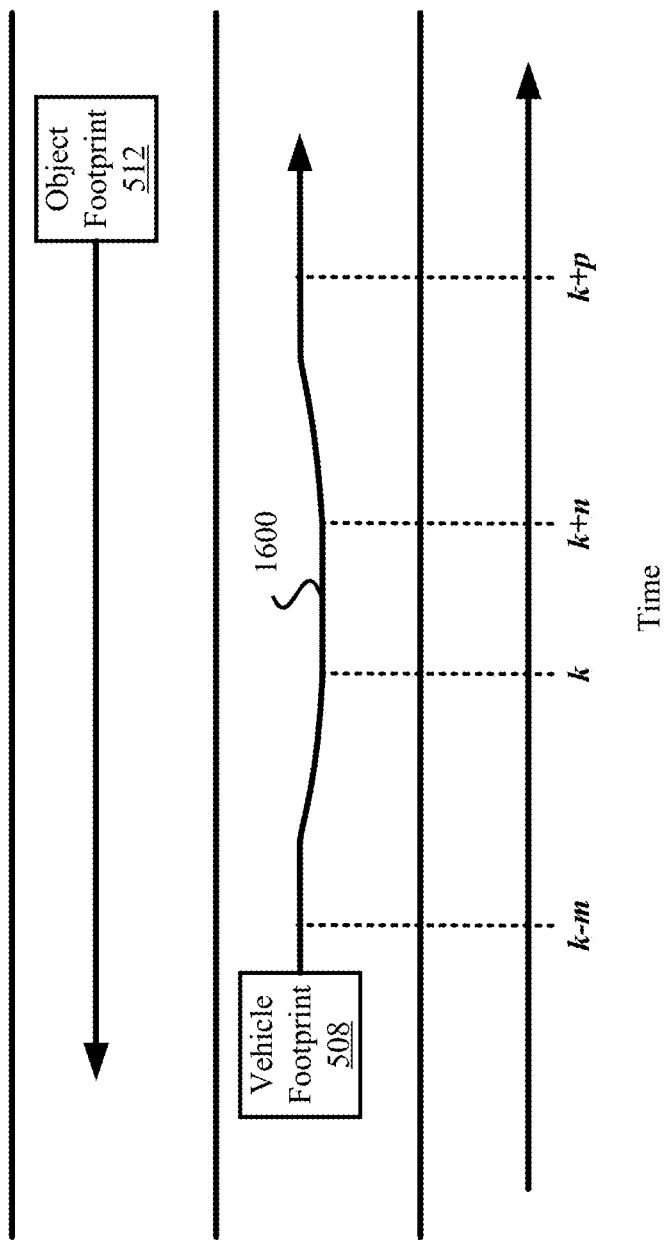
FIG. 16 illustrates a lateral vehicle trajectory.

Thereafter, a lateral vehicle trajectory is generated in 424 by the system based on the mover strong boundary and weak boundary. An illustrative lateral vehicle trajectory 1600 is shown in FIG. 16. The vehicle is caused to follow the lateral vehicle trajectory in 426. Subsequently, 428 is performed where method 400 ends or other operations are performed (for example, return to 404).

Figure 15:
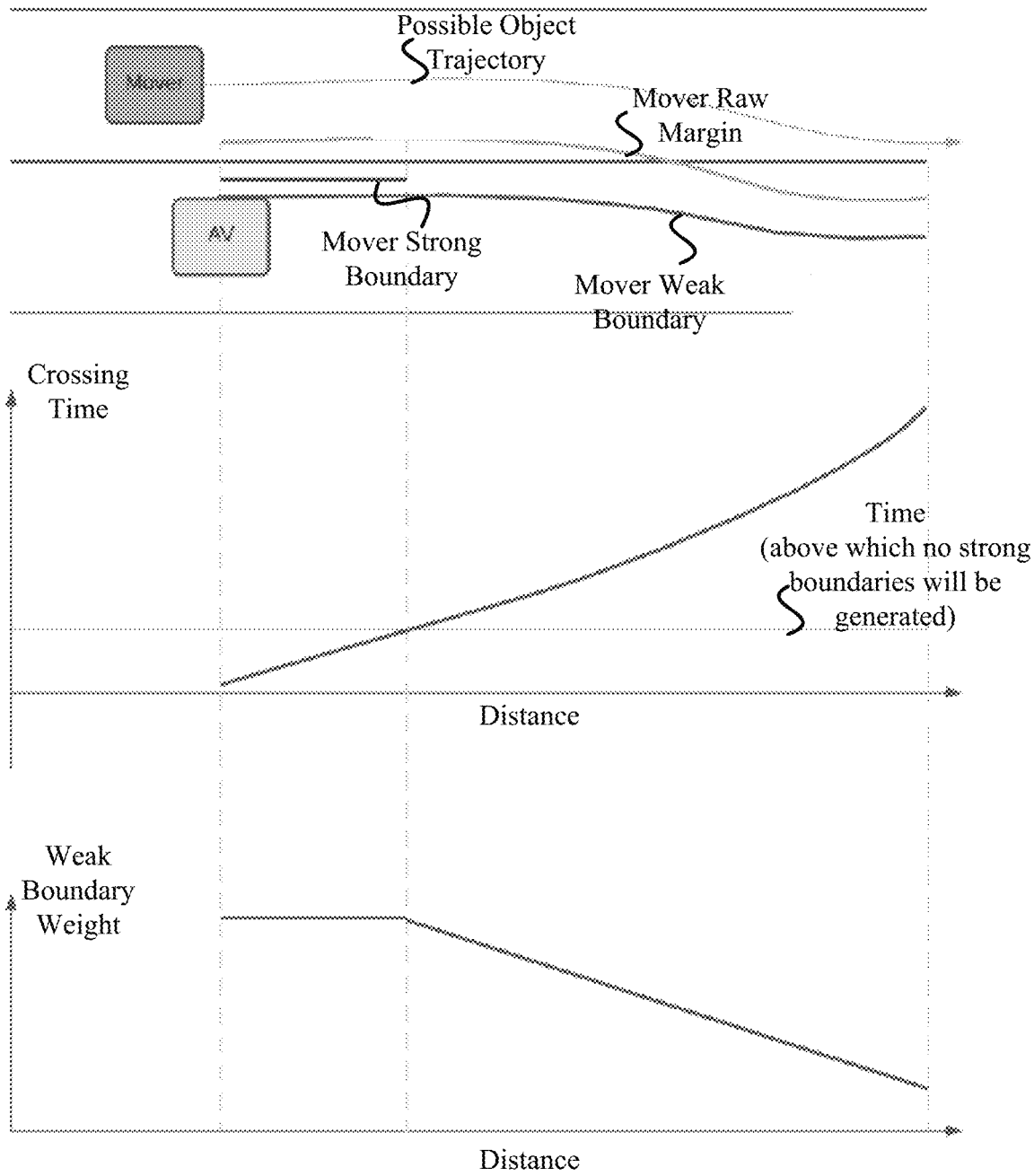

FIG. 15 illustrates a corner case where deweighting a mover weak boundary is performed given the crossing time per location. In this example, the moving object is moving alongside the AV and is predicted to bias toward the AV lane in the long-term horizon. Since the predicted state is far in time there is a lot of uncertainty associated with it. Therefore, the weak boundary is de-weighted in the longer time horizon until the prediction state is more certain and the crossing time is closer.

Figure 17:
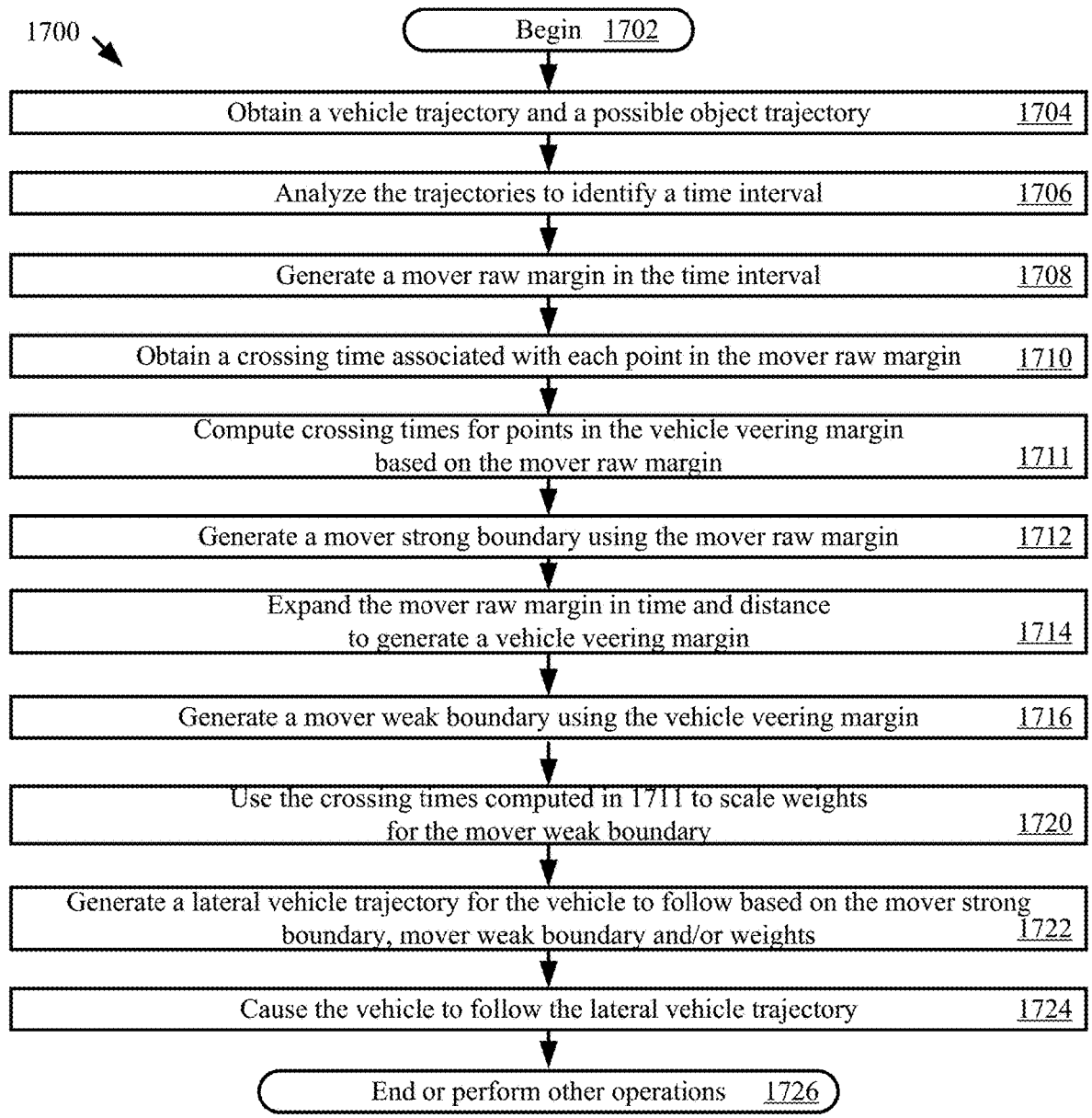
FIG. 17 illustrates another method for operating a vehicle.

Another method 1700 for operating a vehicle (for example, vehicle 102 of FIG. 1) is shown in FIG. 17. All or some of the operations of method 1700 can be performed by an onboard computing device (for example, onboard computing device 122 of FIGS. 1 and/or 220 of FIG. 2) of the AV and/or a remote computing device (for example, server 110 of FIG. 1). Some of the operations of method 1700 can be performed in a different order than that shown in FIG. 17 in accordance with a given application of the present solution.

Method 1700 begins with 1702 and continues with 1704 where the computing device obtains a vehicle trajectory (for example, assumed vehicle trajectory 352 of FIG. 3 or 510 of FIG. 5) for the vehicle and a possible object trajectory (for example, possible object trajectory 310 of FIG. 3 or 514 of FIG. 5) for a moving object (for example, object 103, 114 or 116 of FIG. 1). The trajectories are analyzed by the computing device in 1706 to identify a time interval (for example, time interval 702 of FIG. 7) in which a footprint of the vehicle (for example, vehicle footprint 508 of FIGS. 5-7) overlaps laterally with a footprint of the object (for example, object footprint 512 of FIGS. 5-7).

Next in 1708, the computing device generates a mover raw margin (for example, mover raw margin 804 of FIG. 8) in the time interval by shifting the footprint of the vehicle laterally until contact is made with the footprint of the object. A crossing time (for example crossing times t1, t2, t3, t4, t5, t6, t7 of FIG. 11) is obtained by the computing device in 1710 for each point (for example, points 1100 of FIG. 1) in the mover raw margin. Each of these crossing times comprises a time at which the vehicle is lateral to the moving object at a location of a respective point in the mover raw margin.

Crossing times are computed in 1711 for points in the vehicle veering margin based on the mover raw margin. A crossing time for each point in the vehicle veering margin, which is located before a start point (for example, point 1102 of FIG. 1) of the mover raw margin, is set equal to a time (for example, time t1 of FIG. 11) associated with the start point of the mover raw margin. The crossing time for each point in the vehicle veering margin, which is located after an end point (for example, end point 1104 of FIG. 11) of the mover raw margin, is set equal to a time (for example, time t7 of FIG. 11) associated with the end point of the mover raw margin.

In 1712, the computing device generates a mover strong boundary (for example, mover strong boundary 1200 of FIG. 12 or 1300 of FIG. 13) by buffering the mover raw margin in the direction towards the vehicle when the corresponding crossing times are equal to or less than a threshold time (for example, 30-180 seconds). A constant weight is assigned to the mover strong boundary which reflects an incentive to avoid reaching a minimum distance (for example, 3-5 feet) from the object.

The mover raw margin is expanded in time and distance in 1714 to generate a vehicle veering margin (for example, vehicle veering margin 906 of FIG. 9). The computing device generates a mover weak boundary (for example, mover weak boundary 1400 of FIG. 14) in 1716. The mover weak boundary is generated by laterally buffering the vehicle veering margin in a direction towards the vehicle. The amount by which the vehicle veering margin is laterally shifted is greater than an amount by which the mover raw margin is laterally shifted to generate the mover strong boundary.

The crossing times are used in 1720 to scale weights for the mover weak boundary. This scaling can be achieved, for example, by combining (adding, subtracting or multiplying) the weights with the respective crossing times or other values selected based on the crossing times. In the later scenarios, the crossing times can be used as indexes to a look up table (LUT) which stores scaling values so as to be respectively associated with the crossing times. These weights for the mover weak boundary reflect an incentive for the vehicle to react to the mover weak boundary.

In 1722, the computing device generates a lateral vehicle trajectory (for example, lateral vehicle trajectory 1600 of FIG. 16) for the vehicle to follow based on at least the mover strong boundary, the mover weak boundary and/or the weights. The vehicle is caused to follow the lateral vehicle trajectory in 1724. Subsequently, 1726 is performed where method 1700 ends or other operations are performed.

Figure 18:
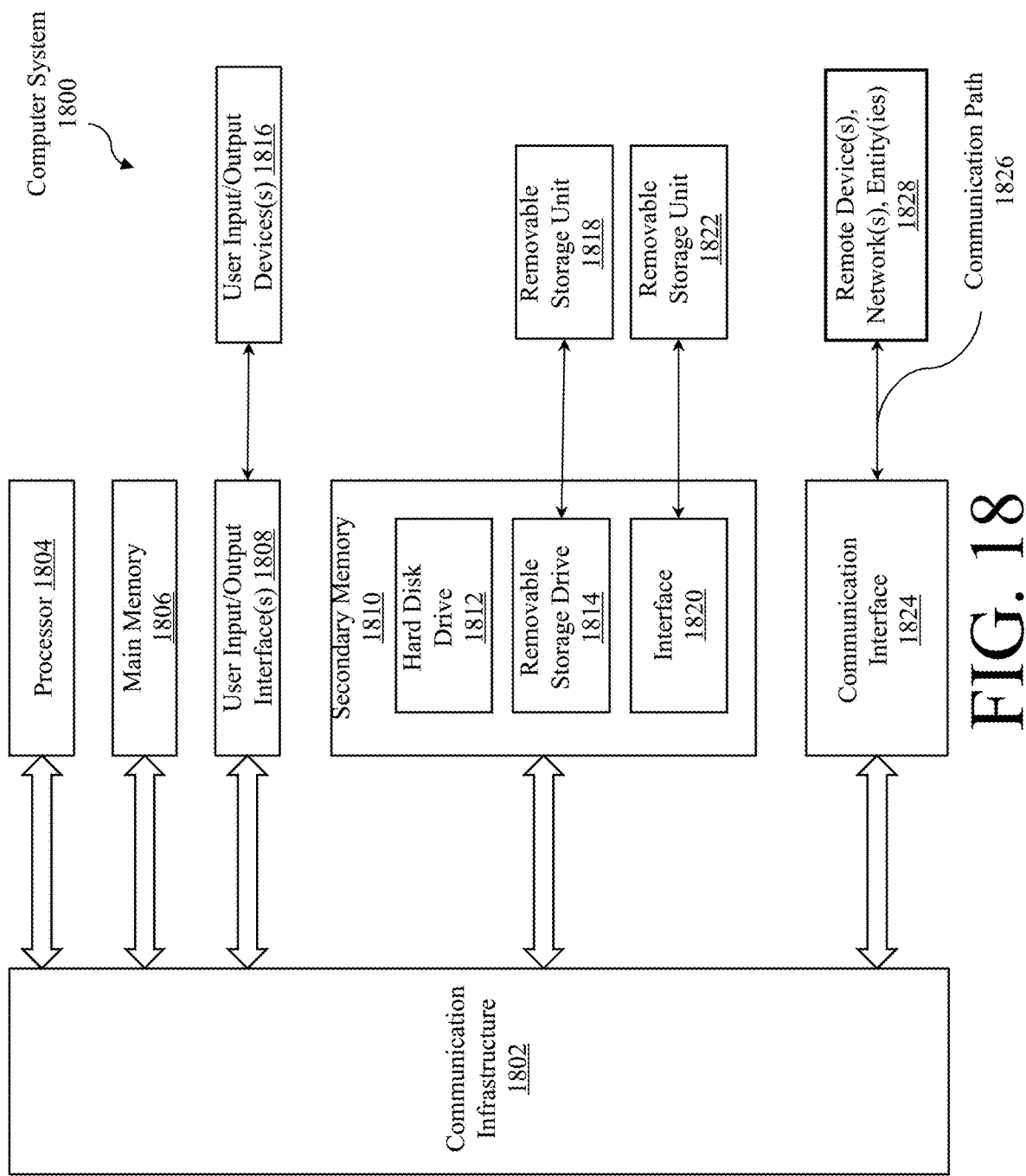
FIG. 18 illustrates a computer system useful for implementing various embodiments.

Various embodiments can be implemented, for example, using one or more computer systems, such as computer system 1800 shown in FIG. 18. Computer system 1800 can be any computer capable of performing the functions described in this document.

Computer system 1800 includes one or more processors (also called central processing units, or CPUs), such as a processor 1804. Processor 1804 is connected to a communication infrastructure or bus 1802. Optionally, one or more of the processors 1804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1800 also includes user input/output device(s) 1816, such as monitors, keyboards, pointing devices, etc., that communicate with communication infrastructure 1802 through user input/output interface(s) 1808.

Computer system 1800 also includes a main or primary memory 1806, such as random access memory (RAM). Main memory 1806 may include one or more levels of cache. Main memory 1806 has stored therein control logic (i.e., computer software) and/or data.

Computer system 1800 may also include one or more secondary storage devices or memory 1810. Secondary memory 1810 may include, for example, a hard disk drive 1812 and/or a removable storage device or drive 1814. Removable storage drive 1814 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 1814 may interact with a removable storage unit 1818. Removable storage unit 1818 includes a computer usable or readable storage device having stored thereon computer software (control logic) and/or data. Removable storage unit 1818 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 1814 reads from and/or writes to removable storage unit 1818 in a well-known manner.

According to an example embodiment, secondary memory 1810 may include other means, instrumentalities or other approaches for allowing computer programs and/or other instructions and/or data to be accessed by computer system 1800. Such means, instrumentalities or other approaches may include, for example, a removable storage unit 1822 and an interface 1820. Examples of the removable storage unit 1822 and the interface 1820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1800 may further include a communication or network interface 1824. Communication interface 1824 enables computer system 1800 to communicate and interact with any combination of remote devices, remote networks, remote entities, etc. (individually and collectively referenced by reference number 1828). For example, communication interface 1824 may allow computer system 1800 to communicate with remote devices 1828 over communications path 1826, which may be wired and/or wireless, and which may include any combination of LANs, WANs, the Internet, etc. Control logic and/or data may be transmitted to and from computer system 1800 via communication path 1826.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 1800, main memory 1806, secondary memory 1810, and removable storage units 1818 and 1822, as well as tangible articles of manufacture embodying any combination of the foregoing. Such control logic, when executed by one or more data processing devices (such as computer system 1800), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 18. In particular, embodiments can operate with software, hardware, and/or operating system implementations other than those described in this document.

Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments but should be defined only in accordance with the following claims and their equivalents.

As described above, this document discloses system, method, and computer program product embodiments for operating a vehicle. The system embodiments include a processor or computing device implementing the methods for operating a vehicle. The computer program embodiments include programming instructions, for example, stored in a memory, to cause a processor to perform the data management methods described in this document. The system embodiments also include a processor which is configured to perform the methods described in this document, for example, via the programming instructions. More generally, the system embodiments include a system comprising means to perform the steps of the any of the methods described in this document.

What is claimed is:

1. A method for operating a vehicle, comprising:
obtaining, by a computing device, a vehicle trajectory for the vehicle and a possible object trajectory for a moving object;
analyzing, by the computing device, the vehicle trajectory and the possible object trajectory to identify a time interval in which a footprint of the vehicle overlaps laterally with a footprint of the moving object, wherein the footprint of the vehicle does not overlap with the footprint of the moving object longitudinally during the time interval;
generating, by the computing device, a mover raw margin in the time interval by shifting the footprint of the vehicle laterally until contact is made with the footprint of the object;
obtaining, by the computing device, a crossing time associated with each point of a plurality of points in the mover raw margin;
generating, by the computing device, a mover strong boundary by laterally shifting at least one point of the mover raw margin in the direction towards the vehicle when the crossing time associated with said at least one point is equal to or less than a threshold time;
generating a lateral vehicle trajectory for the vehicle to follow based on at least the mover strong boundary; and
controlling the vehicle to follow the lateral vehicle trajectory.

2. The method of claim 1, wherein controlling the vehicle to follow the lateral vehicle trajectory comprises steering the vehicle laterally toward the moving object while a center of gravity of the vehicle does not cross the mover strong boundary.

3. The method according to claim 1, wherein the crossing time comprises a time at which the vehicle is lateral to the moving object at a location of a respective point of the plurality of points in the mover raw margin.

4. The method according to claim 1, wherein a constant weight is assigned to the mover strong boundary which reflects an incentive to avoid reaching a minimum distance from the object.

5. The method according to claim 1, further comprising:
expanding, by the computing device, the mover raw margin in time and distance to generate a vehicle veering margin; and
generating, by the computing device, a mover weak boundary by laterally shifting the vehicle veering margin in a direction towards the vehicle by a first amount that is greater than a second amount by which said point of the mover raw margin is laterally shifted to generate the mover strong boundary.

6. The method according to claim 5, further comprising computing, by the computing device, crossing times for a plurality of points in the vehicle veering margin based on the mover raw margin.

7. The method according to claim 6, wherein the crossing time for each one of the plurality of points in the vehicle veering margin, which is located before a start point of the mover raw margin, is set equal to a time associated with the start point of the mover raw margin.

8. The method according to claim 6, wherein the crossing time for each one of the plurality of points in the vehicle veering margin, which is located after an end point of the mover raw margin, is set equal to a time associated with the end point of the mover raw margin.

9. The method according to claim 6, further comprising using the crossing times associated with the vehicle veering margin to scale weights for the mover weak boundary.

10. The method according to claim 9, wherein the weights for the mover weak boundary reflect an incentive for the vehicle to react to the mover weak boundary.

11. A system, comprising:
a memory; and
at least one processor coupled to the memory and configured to:
obtain a vehicle trajectory for the vehicle and a possible object trajectory for a moving object;
analyze the vehicle trajectory and the possible object trajectory to identify a time interval in which a footprint of the vehicle overlaps laterally with a footprint of the moving object;
generate a mover raw margin in the time interval by shifting the footprint of the vehicle laterally until contact is made with the footprint of the object;
obtain a crossing time associated with each point of a plurality of points in the mover raw margin;
generate a mover strong boundary by laterally shifting at least one point of the mover raw margin in the direction towards the vehicle when the crossing time associated with said at least one point is equal to or less than a threshold time;
generate a lateral vehicle trajectory for the vehicle to follow based on at least the mover strong boundary; and
control the vehicle to follow the lateral vehicle trajectory.

12. The system of claim 11, wherein the footprint of the vehicle does not overlap with the footprint of the moving object longitudinally during the time interval, and controlling the vehicle to follow the lateral vehicle trajectory comprises steering the vehicle laterally toward the mover strong boundary while a center of gravity of the vehicle does not cross the mover strong boundary.

13. The system according to claim 11, wherein the crossing time comprises a time at which the vehicle is lateral to the moving object at a location of a respective point of the plurality of points in the mover raw margin.

14. The system according to claim 11, wherein a constant weight is assigned to the mover strong boundary which reflects an incentive to avoid reaching a minimum distance from the object.

15. The system according to claim 11, wherein the at least one processor is further configured to:
expand the mover raw margin in time and distance to generate a vehicle veering margin; and
generate a mover weak boundary by laterally shifting the vehicle veering margin in a direction towards the vehicle by a first amount that is greater than a second amount by which said point of the mover raw margin is laterally shifted to generate the mover strong boundary.

16. The system according to claim 15, wherein the at least one processor is further configured to compute crossing times for a plurality of points in the vehicle veering margin based on the mover raw margin.

17. The system according to claim 16, wherein the crossing time for each one of the plurality of points in the vehicle veering margin, which is located before a start point of the mover raw margin, is set equal to a time associated with the start point of the mover raw margin.

18. The system according to claim 16, wherein the crossing time for each one of the plurality of points in the vehicle veering margin, which is located after an end point of the mover raw margin, is set equal to a time associated with the end point of the mover raw margin.

19. The system according to claim 16, wherein the at least one processor is further configured to use the crossing times associated with the vehicle veering margin to scale weights for the mover weak boundary.

20. A non-transitory computer-readable medium that stores instructions that is configured to, when executed by at least one computing device, cause the at least one computing device to perform operations comprising:
   obtaining a vehicle trajectory for the vehicle and a possible object trajectory for a moving object;
   analyzing the vehicle trajectory and the possible object trajectory to identify a time interval in which a footprint of the vehicle overlaps laterally with a footprint of the object;
   generating a mover raw margin in the time interval by shifting the footprint of the vehicle laterally until contact is made with the footprint of the object;
   obtaining a crossing time associated with each point of a plurality of points in the mover raw margin;
   generating a mover strong boundary by laterally shifting at least one point of the mover raw margin in the direction towards the vehicle when the crossing time associated with said at least one point is equal to or less than a time;
   generating a lateral vehicle trajectory for the vehicle to follow based on at least the mover strong boundary; and
   controlling the vehicle to follow the lateral vehicle trajectory.

\* \* \* \* \*